Patented Dec. 20, 1949

2,491,915

UNITED STATES PATENT OFFICE 2,491,915

PROCESS FOR THE PREPARATION OF ACETALS

Paul Latrell Barrick, Wilmington, and Albert Alan Pavlic, Claymont, Del., assignors to E. I. du Pont de Nemours & Company, Wilmington, Del., a corporation of Delaware No Drawing. Application June 7, 1946, Serial No. 675,316

10 Claims. (Cl. 260—615)

This invention relates to acetals and more particularly it relates to the synthesis of acetals.

Heretofore acetals have generally been prepared by the reaction of aldehydes with an alcohol in the presence of an acidic catalyst such as hydrogen chloride. This reaction must be operated under essentially anhydrous conditions since acetal formation is a reversible reaction and the acetals are hydrolyzed easily by water in the presence of a mineral acid catalyst. Furthermore, the use of difficultly available and expensive aldehydes under the necessarily very carefully controlled conditions in many cases makes the reaction commercially impractical.

This invention has as an object the provision of a new and improved process for the production of acetals. A further object is to provide, relatively cheaply, acetals from readily available low-cost raw materials. Other objects of the invention will appear hereinafter.

These objects are accomplished by the following invention wherein a mixture of carbon monoxide and hydrogen is reacted in the presence of a hydrogenation catalyst with a mixture comprising an olefinic unsaturated compound and a saturated alcohol preferably in the proportion whereby at least two equivalent hydroxyls are present for each ethylenic double bond of the unsaturated compound. The reaction may be illustrated by the following equation, using a lower monoolefinic reaction component:

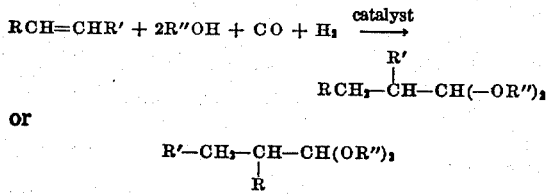

wherein the R and R' are hydrogen, alkyl groups of one to sixteen carbon atoms, or, together, a bivalent saturated aliphatic hydrocarbon radical and R'' is an alkyl group.

Conditions for effecting the above conversion comprise heating the reactants specified at 80–300° C. under pressures of 20–1200 atm. with a hydrogenation catalyst selected from the metals of the VIIIth group of the periodic table. Cobalt and ruthenium catalysts are particularly effective.

The more detailed practice of the invention is illustrated by the following examples wherein parts are given by weight. There are of course, many forms of the invention other than these specific embodiments.

EXAMPLE I

A silver-lined autoclave was charged with 5 parts of finely divided metallic cobalt catalyst, 50 parts of methanol and 28 parts of isobutylene. An equimolecular carbon monoxide/hydrogen mixture was added under pressure until the total pressure was about 1400 lbs./sq. in. and the autoclave was then heated to about 135–140° C. The gas mixture was absorbed steadily, fresh gas being admitted from time to time to maintain the working pressure within the range of 800–1400 lbs./sq. in. A total pressure drop of about 1200 lbs./sq. in. was recorded during three hours and an increase in weight of 12 parts was obtained. Fractionation of the above reaction mixture gave approximately 40 parts of the dimethyl acetal of isovaleraldehyde, B. P. 48–50° C./48 mm. The product was identified by conversion to the 2,4-dinitrophenylhydrazone derivative of the corresponding aldehyde, M. P. 123–124° C.

EXAMPLE II

In accordance with the procedure of Example I, a charge of 5 parts of finely divided metallic cobalt catalyst, 84 parts of diisobutylene and 48 parts of methanol was introduced into a silver-lined autoclave. A 1:1 mixture of carbon monoxide/hydrogen was introduced under 800–1600 lbs./sq. in. pressure and the contents of the autoclave heated to 110–115° C. A total pressure drop of about 2400 lbs./sq. in. occurred during three hours, fresh gas being added at intervals to maintain the pressure within the desired range. Fractional distillation of the product gave 80 parts of acetal, B. P. 109–111° C./50 mm. This colorless, pleasant smelling oil had the following refractive index and density: $n_D^{25}=1.4181$; $d_4^{25}=0.8436$. Analysis: Calculated for $C_{11}H_{24}O_2$; C, 70.20%; H, 12.78%. Found: C, 70.31%; H, 13.08%.

The 2,4-dinitrophenylhydrazone derivative prepared from the aldehyde which resulted on hydrolysis of this acetal melted at 92.5–95° C. and the analysis of this derivative for nitrogen checked the calculated values as follows: Analysis: Calculated for $C_{15}H_{22}N_4O_4$; N, 17.40%. Found: N, 17.63%.

EXAMPLE III

Forty-one parts of cyclohexene, 80 parts of methanol and 5 parts of a reduced cobalt-copper-thorium oxide (100–3–18) catalyst were charged into a silver-lined pressure tube and pressured to 1100 lbs./sq. in. with an equimolar mixture of carbon monoxide and hydrogen. The tube and contents were heated to 125° C. for four hours with frequent additions of the mixed carbon monoxide/hydrogen gases to maintain the pressure at approximately 1600 lbs./sq. in. A pressure drop of 1400 lbs./sq. in. which corresponded to slightly more than ½ mole of the mixed gases was recorded.

After cooling the tube the pressure was released and the contents removed. The catalyst was separated by filtration and the clear brown colored filtrate was distilled, first at atmospheric pressure to remove excess methanol, and then under reduced pressure to obtain the following fractions:

(1) Up to 65° C./12 mm.—3.2 parts (2 phases—water and the product)
(2) 65–68° C./12 mm.—51.0 parts
(3) Residue—less than 1 part Fraction (2) which had a refractive index of $n_D^{24}=1.4399$ and a density of $d_4^{25}=0.9320$ was the dimethyl acetal of hexahydrobenzaldehyde as evidenced by the preparation of the 2,4-dinitrophenylhydrazone of the aldehyde liberated by hydrolysis of the acetal with dilute mineral acid. This 2,4-dinitrophenylhydrazone melted at 174–176° C., and no depression of the melting point was observed when it was mixed with the 2,4-nitrophenylhydrazone of an authentic sample of hexahydrobenzaldehyde.

EXAMPLE IV

A silver-lined autoclave was flushed with nitrogen and charged with 5 parts of finely divided metallic cobalt catalyst, 54 parts of 1-vinylcyclohexene-3 and 70 parts of methanol. The autoclave was pressured to about 1000 lbs./sq. in. with an equimolar mixture of carbon monoxide and hydrogen and heated to 105–110° C. At this temperature the mixed gas was absorbed smoothly and fresh quantities were added at intervals to maintain the total pressure within the system. The pressure drop recorded during five hours was 3000 lbs./sq. in and the liquid autoclave charge gained approximately 21 parts by weight. The reaction mixture, after removal of catalyst as in the previous example, was fractionated to give two distinct acetal fractions as follows:

*Fraction I*

| Boiling Point | $n_D^{25}$ | $d_4^{25}$ | Yield |
|---|---|---|---|
| 88–96° C./8.5 mm | 1.4575 | 0.939 | Parts 26 |

Analysis: Calculated for $C_{11}H_{20}O_2$: C, 71.74%; H, 10.87%. Found: C, 72.54%; H, 11.55%.

*Fraction II*

| Boiling Point | $n_D^{25}$ | $d_4^{25}$ | Yield |
|---|---|---|---|
| 142–146° C./5.5 mm | 1.4540 | 0.990 | Parts 22 |

Analysis: Calculated for $C_{14}H_{28}O_4$: C, 64.70%; H, 10.77%. Found: C, 64.64%; H, 10.91%.

From the analysis, the low boiling fraction is the dimethyl acetal of a monoaldehyde and the high boiling fraction a tetramethyl acetal of a dialdehyde. These products are probably mixtures of isomeric acetals. Similar ethyl acetals were obtained by substituting ethanol for methanol in the method just described.

EXAMPLE V

A charge of 34 parts of piperylene (B. P. 39–41° C.; $n_D^{25}=1.4209$), 56 parts of ethylene glycol, 0.1 part of paratoluene-sulfonic acid and 1.5 parts of ruthenium oxide catalyst was introduced into a silver-lined pressure reaction vessel, the free space of which was filled with an equimolar mixture of carbon monoxide and hydrogen under 1100 lbs./sq. in. pressure. The charge was heated with agitation to 175° C. for four hours. The product was discharged from the autoclave, the catalyst separated by filtration, and the lower glycol layer removed. Distillation of the remaining material yielded 30 parts of a colorless oil with a pleasant ethereal odor, B. P. 60–70° C./22 mm. This acetal fraction was hydrolyzed with dilute mineral acid and then converted to the 2,4-dinitrophenylhydrazone derivative, M. P. 86.5–88° C. Analysis of this derivative shows it to be the 2,4-dinitrophenylhydrazone of a 6 carbon saturated aldehyde or mixture of aldehydes having the empirical formula $C_6H_{12}O$. Analysis calculated for $C_{12}H_{16}N_4O_4$: C, 51.40%; H, 5.71%; N, 20.00%. Found C, 51.57%, 51.93%; H, 5.83%, 5.63%; N, 20.26%, 20.16%.

To illustrate the difference between operation with an alcohol in the reaction mixture and operation without any alcohol present 1-vinylcyclohexene-3 was reacted with an equimolecular mixture of carbon monoxide and hydrogen in the absence of a solvent and in the presence of cyclohexane and of ethanol respectively. The results are tabulated below.

| | | | |
|---|---|---|---|
| 1-vinylcyclohexene-3 (g.) | 108 | 54 | 54 |
| CO/H₂ (pressure #/sq. in.) | 2000 | 1100–1600 | 1000–1600 |
| Solvent (g.) | None | Cyclohexane (70) | Ethanol (70) |
| Catalyst (cobalt) g. | 5 | 5 | 5 |
| Temperature | 140–145° C | 140–145° C | 105–117° C |
| Pressure Drop (#/sq. in.) | 500 | 500 | 3400 |
| Gain in weight (g.) | 1 | 0.5 | 30 |

The pronounced absorption as evidenced by the 3400 lbs./sq. in pressure drop when ethanol was used as compared with the minor absorption (500 lbs./sq. in pressure drop) when cyclohexane or no solvent was employed shows the greatly increased reaction when an alcohol is employed. This is further demonstrated by the gain in weight.

Although in the foregoing examples certain specific conditions of temperature, pressure, reaction periods, reactants and reactant concentrations have been recited, it is to be understood that these values are subject to considerable variation within the scope of this invention.

For example, although this invention has been illustrated with methyl alcohol, ethyl alcohol and ethylene glycol it is applicable in general to saturated primary and secondary monohydric and dihydric alcohols, i. e. to alcohols having from one to two hydroxyls, the hydroxyl being on carbons attached to at least one hydrogen. Primary monohydric alcohols are preferred, particularly alkanols of from one to four carbon atoms. More particularly methyl alcohol, ethyl alcohol, ethylene glycol and the propylene glycols are preferred because of their availability and reactivity. Other saturated alcohols may be employed. The unsaturated alcohols such as allyl, methallyl, and crotyl alcohols, have been found unsuitable as alcohol components for the production of acetals by the process of this invention. These alcohols, because of their rearrangement to aldehydes under the conditions of the process and because of the condensation of these aldehydes to high boiling and sometimes intractable products, are unsuitable.

This invention is applicable to olefinic unsaturated compounds in general. Especially preferred, because of availability and relative low cost, are the olefinic hydrocarbons containing not more than two ethylenic linkages and the olefinic unsaturated compounds also with not more than two ethylenic linkages and containing ether, carboxyl and ester groups. Examples of olefinic unsaturated compounds which may be used other than those already shown in the examples above include ethylene, propylene, the butylenes, the amylenes, the octenes, the decenes, the dodecenes, the unsaturated naphthenes, polysubstituted ethylenes such as tetramethylethylene, the terpenes such as pinene and dipentene, the alkyl cyclohexenes; crotonic, cinnamic, acrylic, methacrylic abietic, undecylenic, oleic and linoleic acids and the esters, for example, the methyl and ethyl esters of these acids; styrene, stilbene, vinyl acetate, vinyl methyl ether, etc.

In the process of this invention the saturated hydroxylic reactant is preferably present in a proportion of at least two equivalent active hydroxyls for each ethylenic, i. e. carbon to carbon, double bond of the olefinic unsaturated compound. Various mixtures of the carbon monoxide and hydrogen may be used. The molal ratio of carbon monoxide to hydrogen may range from about 1:2 to 2:1. In general, however, it is preferable to keep the molal ratio of the two gases at about 1:1. Mixtures of alcohols and mixtures of olefinic unsaturated compounds may be used.

The temperature limits of this invention lie in the range of 80–300° C. However, it is preferred to operate within the range 100–200° C. since in general the most satisfactory results are obtained within this range.

Satisfactory operating pressures include the range 20–1200 atm. or even higher. The most satisfactory pressure, of course, depends on factors such as the nature of the olefinic unsaturated compounds, the saturated hydroxylic reactants, temperature, catalyst, etc. In general, it has been found convenient to operate at pressures between 80–500 atm.

Hydrogenating catalysts and particularly those comprising metals of the VIIIth group of the periodic table of elements are suitable for the production of acetals by the process of this invention. More particularly hydrogenation catalysts of cobalt and ruthenium are preferred. The activity of these catalysts for the purposes of this invention may be enhanced by such oxides as those of thorium, magnesium, chromium, aluminum, etc.

The products of this invention are useful for various commercial purposes. They may be used as intermediates for the preparation of pharmaceuticals, as solvents, in perfumes and as pest control agents, for example, insecticides, bactericides and fungicides.

The foregoing detailed description has been given for clearness of understanding only and no unnecessary limitations are to be understood therefrom. The invention is not limited to the exact details shown and described for obvious modifications will occur to chemists skilled in the art.

What is claimed is:

1. Process for the preparation of acetals which comprises reacting carbon monoxide and hydrogen at a pressure of 20–1200 atmospheres and a temperature of 80–300° C. in the presence of a cobalt hydrogenation catalyst with methanol, initially present and an acyclic hydrocarbon having one unsaturation and that ethylenic, the methanol being initially present in the proportion of at least two mols per mol of unsaturated hydrocarbon.

2. Process for the preparation of acetals which comprises reacting carbon monoxide and hydrogen at a pressure of 20–1200 atmospheres and a temperature of 80–300° C. in the presence of a cobalt hydrogenation catalyst with an initially present alkanol of one to four carbons having hydrogen on the hydroxyl carbon and an acyclic hydrocarbon having one unsaturation and that ethylenic, the alkanol being initially present in the proportion of at least two mols per mol of unsaturated hydrocarbon.

3. Process for the preparation of acetals which comprises reacting carbon monoxide and hydrogen at a pressure of 20–1200 atmospheres and a temperature of 80–300° C. in the presence of a cobalt hydrogenation catalyst with an initially present alkanol of one to four carbons having hydrogen on the hydroxyl carbon and a non-aromatic hydrocarbon having one unsaturation and that ethylenic, the alkanol being initially present in the proportion of at least two mols per mol of unsaturated hydrocarbon.

4. Process for the preparation of acetals which comprises reacting carbon monoxide and hydrogen at a pressure of 20–1200 atmospheres and a temperature of 80–300° C. in the presence of a cobalt hydrogenation catalyst with an initially present saturated alcohol having from one to two hydroxyls and these on hydrogen-bearing carbon and a hydrocarbon having one and only one carbon to carbon unsaturation and that ethylenic, the alcohol being initially present in the proportion of at least two mols per mol of unsaturated hydrocarbon.

5. Process of claim 4 wherein the alcohol is ethylene glycol.

6. Process for the preparation of acetals which comprises reacting carbon monoxide and hydrogen at a pressure of 20–1200 atmospheres and a temperature of 80–300° C. in the presence of a cobalt hydrogenation catalyst with methanol initially present, and a hydrocarbon having one and only one carbon to carbon unsaturation and that ethylenic, the methanol being initially present in the proportion of at least two mols per mol of unsaturated hydrocarbon.

7. Process for the preparation of acetals which comprises reacting carbon monoxide and hydrogen in the presence of a hydrogenation catalyst with an initially present saturated alcohol and an olefinic unsaturated compound, the alcohol being initially present in the proportion of at least two mols per mol of unsaturated compound.

8. Process for the preparation of acetals which comprises reacting carbon monoxide and hydrogen at a pressure of at least 20 atmospheres and a temperature of 80–300° C. in the presence of a hydrogenation catalyst with an initially present saturated alcohol and a hydrocarbon having from one to two olefinic linkages, the alcohol being initially present in the proportion of at least two mols per mol of unsaturated hydrocarbon.

9. Process for the preparation of acetals which comprises reacting carbon monoxide and hydrogen at a pressure of at least 20 atmospheres and a temperature of 80-300° C. in the presence of a hydrogenation catalyst with an initially present saturated alcohol and a hydrocarbon having two olefinic linkages, the alcohol being initially present in the proportion of at least two mols per mol of unsaturated hydrocarbon.

10. Process for the preparation of acetals which comprises reacting carbon monoxide and hydrogen at a pressure of 20-1200 atmospheres and a temperature of 80-300° C. in the presence of a cobalt hydrogenation catalyst with a hydrocarbon of but one unsaturation and that a double bond and a primary alkanol of one to four carbons, said alkanol being initially present in the reaction mixture in the proportion of at least two mols per mol of unsaturated hydrocarbon.

PAUL LATRELL BARRICK.
ALBERT ALAN PAVLIC.

REFERENCES CITED

The following references are of record in the file of this patent:

UNITED STATES PATENTS

| Number | Name | Date |
|---|---|---|
| 1,312,186 | King | Aug. 5, 1919 |
| 1,979,717 | Vail | Nov. 6, 1943 |
| 2,327,066 | Roelen | Aug. 17, 1943 |
| 2,437,600 | Gresham | Mar. 9, 1948 |

FOREIGN PATENTS

| Number | Country | Date |
|---|---|---|
| 283,112 | Great Britain | of Nov. 15, 1928 |
| 873,391 | France | Mar. 23, 1942 |
| 879,903 | France | Dec. 10, 1942 |

OTHER REFERENCES

Ser. No. 268,024, Roelen (A. P. C.), pub. July 13, 1943.